UNITED STATES PATENT OFFICE.

INGENUIN HECHENBLEIKNER, OF CHARLOTTE, NORTH CAROLINA, ASSIGNOR TO CHEMICAL CONSTRUCTION COMPANY, OF CHARLOTTE, NORTH CAROLINA, A CORPORATION.

PROCESS OF MAKING PHOSPHORIC ACID, &c.

1,313,379.     Specification of Letters Patent.     Patented Aug. 19, 1919.

No Drawing.     Application filed June 9, 1919. Serial No. 302,730.

*To all whom it may concern:*

Be it known that I, INGENUIN HECHENBLEIKNER, a citizen of the United States, residing at Charlotte, in the county of Mecklenburg and State of North Carolina, have invented certain new and useful Improvements in Processes of Making Phosphoric Acid, &c., of which the following is a specification.

In my U. S. Patent No. 1,297,464, dated March 18, 1919, there is disclosed a process of producing hydrofluosilicic acid from the silicon fluorid which results from the acidulation of ground phosphate rock, said acid being accompanied by certain amounts of gelatinous hydrosilicic acid and hydrofluoric acid, and the present invention relates to a process of using said products for making calcium phosphate or other purposes.

The present invention embodies or results in a process wherein said recovered acids are used for producing high grade phosphoric acid. This is attended with various advantages over ordinary or known processes of producing phosphoric acid, and gives initially a more valuable product.

The reaction between the phosphate rock and the hydrofluosilicic and hydrofluoric acids resulting from the said patented process takes place according to the following formula:

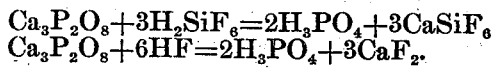

It is unnecessary to filter the acid gained by the process described in Patent 1,297,464 because the calcium silicon fluorid and the calcium fluorid formed, make this gelatinous silica settle easily and give an easily washable cake and the acid which clarifies rapidly can be decanted easily from the precipitate. The diluted hydrofluosilicic acid and hydrofluoric acid containing the gelatinous hydrosilicic acid, and finely ground phosphate rock, are mixed thoroughly in a mechanical mixer and as the reaction develops heat it decomposes all the phosphate rock very quickly and completely. The diluted phosphoric acid obtained in this way is easily filtered on account of the properties mentioned above and is of exceptional purity as the impurities in the phosphate rock are insoluble in these dilute acids. The dilute phosphoric acid gained in this way from phosphate rock and hydrofluosilicic acid is of greater purity than ordinary phosphoric acid obtained by treatment of ground phosphate rock with dilute sulfuric acid. The same can be used for mixing in ordinary fertilizer by diluting concentrated sulfuric acid therewith and said diluted sulfuric acid when mixed with ground phosphate rock will produce an acid phosphate containing more available phosphoric acid or it may be concentrated and used for making double superphosphate by mixing with ground phosphate rock or it may be used in numerous other commercial uses for which commercially pure phosphoric acid is used. In this case this phosphoric acid has the advantage of not containing any sulfates or sulfuric acid and is of exceptional purity.

The invention therefore involves the production of phosphoric acid and also the use of the same in connection with sulfuric acid in producing an acid phosphate available for fertilizer purposes.

I claim:

1. The method of making phosphoric acid, consisting in treating phosphate rock with a mixture of dilute hydrofluosilicic and hydrofluoric acids.

2. The method of obtaining phosphoric acid, consisting in treating phosphate rock with a mixture of dilute hydrofluosilicic and hydrofluoric acids and separating the phosphoric acid from the precipitates.

In testimony whereof I affix my signature in presence of two witnesses.

INGENUIN HECHENBLEIKNER.

Witnesses:
    GEO. L. SIBLEY,
    WAYT THOMAS.